Figure 1:
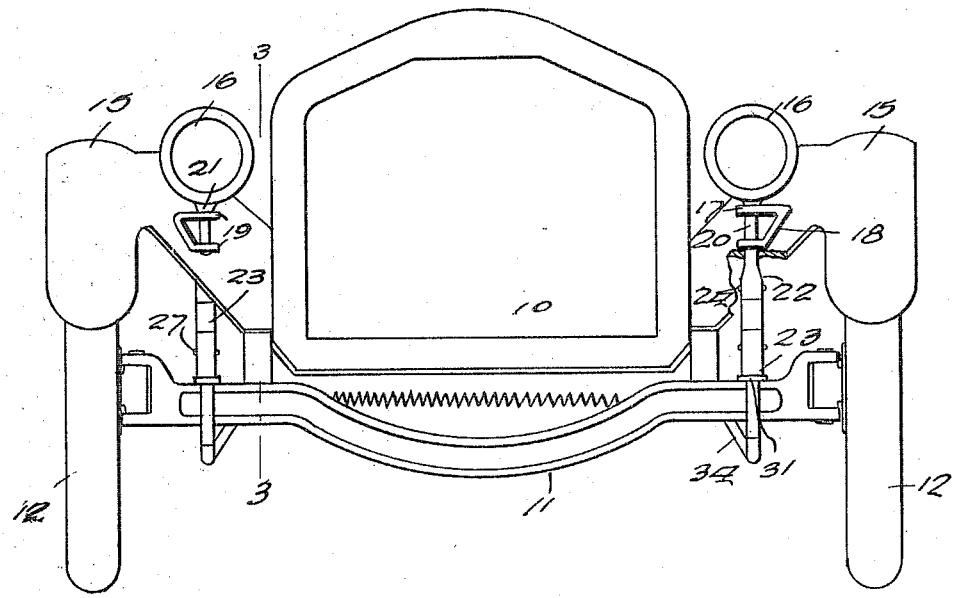

E. EGGIMANN.
DIRIGIBLE AUTOMOBILE HEADLIGHT.
APPLICATION FILED JUNE 28, 1918.

1,305,785.

Patented June 3, 1919.
2 SHEETS—SHEET 1.

Ernest Eggimann
Inventor

By Geo. P. Kimmel
Attorney

E. EGGIMANN.
DIRIGIBLE AUTOMOBILE HEADLIGHT.
APPLICATION FILED JUNE 28, 1918.
1,305,785.
Patented June 3, 1919.
2 SHEETS—SHEET 2.
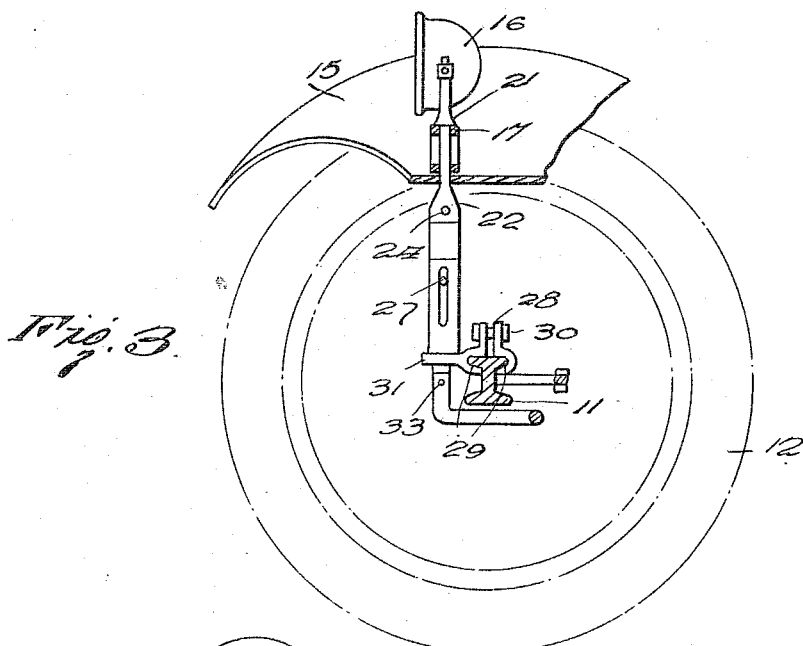
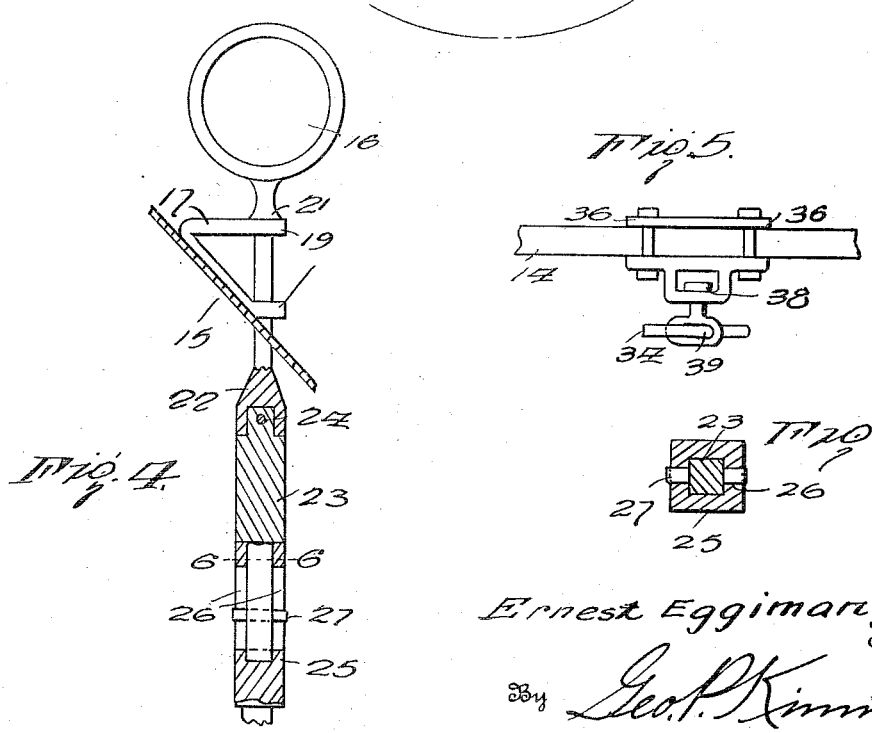
Ernest Eggimann
Inventor
By Geo. P. Kimmel
Attorney

UNITED STATES PATENT OFFICE.

ERNEST EGGIMANN, OF ARGYLE, WISCONSIN.

DIRIGIBLE AUTOMOBILE-HEADLIGHT.

1,305,785.　　　　Specification of Letters Patent.　　Patented June 3, 1919.

Application filed June 28, 1918.　Serial No. 242,394.

*To all whom it may concern:*

Be it known that I, ERNEST EGGIMANN, a citizen of Switzerland, residing at Argyle, in the county of Lafayette and State of Wisconsin, have invented certain new and useful Improvements in Dirigible Automobile-Headlights, of which the following is a specification.

This invention relates to headlights for automobiles, and more particularly to dirigible headlights, the object thereof being to mount the headlights of an automobile in a novel manner and to cause the same to turn with the turning of the front or steering wheels, so as to direct the light rays from the headlights in the direction of travel of the car when turning.

A still further object of the invention is to provide a turning mechanism for headlights as described, which comprises a novel construction and arrangement of parts adapted to prevent the transmission of shocks and vibrations to the headlights or lamps, especially when traveling over uneven road surfaces, and to centralize the position of the lamps, the device being adaptable with but few modifications to various types of cars.

With the above and other objects in view, as will appear as the description proceeds, the invention comprises the various novel features of construction and arrangement of parts which will be more fully described herein and set forth with particularity in the claims appended hereto.

Reference is had to the accompanying drawings forming a part of this application, in which like reference characters indicate the corresponding parts throughout the several views, in which—

Figure 2:
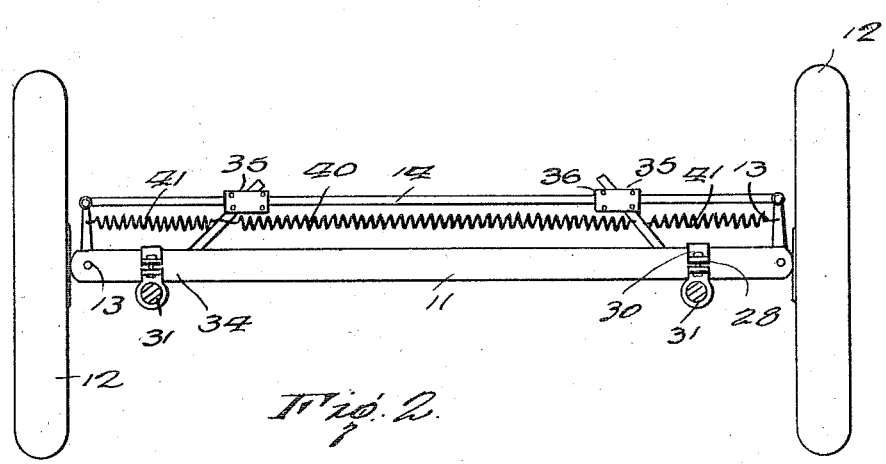

Figure 1 is a front elevation of an automobile equipped with my improved dirigible headlight mechanism, Fig. 2 is a plan view showing the centralizing means applied to the front axle and connected with the steering rod, Fig. 3 is a vertical sectional view taken on the line 3—3 of Fig. 1 looking outwardly, Fig. 4 is an enlarged detail vertical sectional view showing the mounting for one of the headlights, Fig. 5 is a fragmentary enlarged horizontal sectional view showing the connection with the front axle, and Fig. 6 is an enlarged sectional view taken on the line 6—6 of Fig. 4 looking downwardly.

Referring to the drawings in detail, wherein I have illustrated the application of my improved dirigible headlight mechanism, 10 designates the usual hood and radiator of an automobile, 11 the front axle, 12 the front or steering wheels having the usual steering knuckles 13, and rod 14 connecting the same to cause simultaneous actuation of the steering wheels. The fenders are indicated by the numeral 15 and the lamps by the numeral 16, these being the usual form of headlights which are supported in fixed brackets in various ways upon different types of motor vehicles or automobiles.

I have especially illustrated the application of the device to an Overland car, but desire to have it understood that the same is capable of application to other types of cars, and that this will require but slight modification to the general arrangement of parts as will be set forth in detail. In lieu of the ordinary lamp support or bracket carried upon the fenders or mud guards 15 inwardly of the portions arranged over the tires, I provide brackets 17, said brackets having side portions 18 connected to the mud guards and provided with spaced upper and lower portions 19 receiving the lamp standards 20 therethrough, the lamps standards being provided with enlargements 21 to support the lamps for turning movement.

The lower ends of the standards 20 are provided with enlargements 22 having sockets therein receiving the reduced upper ends of the rectangular sections 23, a coupling being effected through the medium of a pin 24. The lower portion of the section 23 is reduced and received within a holder 25 having opposed vertical slots 26 receiving therein a guiding and retaining means in the form of a cross pin 27, carried by the reduced portion of the section 23. The holder 25 constitutes the lower section of the standard and is arranged in and supported upon a two part clamp 28 secured to the axle 11, said clamp having a pair of jaws engaging the axle as shown at 29 and being connected as shown at 30, each clamp having a forwardly extending apertured arm 31 producing a support for the standard 32 adapted to extend through the arm support 31 so as to turnably carry the standard upon the shoulders thus provided. The lower extremity is threaded and also detachably coupled through the medium of a pin or the like 33 with the upturned forward end of an arm 34 which extends rearwardly and inwardly for connection to the steering rod 14 through the medium of a clamp 35, the forward end of the arm 34 at its upturned portion, being socketed to receive the reduced portion of the holder 25.

The clamps 35 are provided at spaced distances from the ends of the steering rod 14 to receive the arms 34 of the lamps, and said clamps comprise upper and lower plates 36 connected as shown at 37, the upper portion being rigid and the lower portion being loose or swiveled, as shown at 38 and provided with an elongated or ovoidal opening 39 receiving in each, one of the arms 34 so that the latter will be loose with respect to its connection with the steering rod 14, thereby allowing sufficient play to avoid transmission of shocks and vibrations to the lamps from the steering mechanism, while still causing the turning of the lamps when the turning or steering mechanism is operated to turn the front or steering wheels, for directing the vehicle in a desired course. In this manner, the lamps will not receive every jerk of the wheels, but will be turned when the wheels have been turned beyond a limited degree, thereby directing light rays upon the roadway in front of the car when turning around sharp corners or turns. However, in order to centralize the lamps, so as to hold them forwardly directed, a retractile coil spring 40 has its terminals connected to the arms 34 and additional springs 41 are connected to said arms and to the rearwardly projecting arms of the steering knuckles 13. By this means, the lamps will be prevented from wabbling or turning to one side accidentally owing to the loose connection with the steering rod, already described. Also, the vertically adjustable connection between the section 23 and the holder 25, will permit the device to be extended to accommodate the up and down movements of the axle, with respect to the body, in absorbing the shocks and vibrations through the medium of the usual springs.

From the foregoing description taken in connection with the accompanying drawings, it is thought that a clear and comprehensive understanding of the construction, operation and advantages of my invention may be had, and while I have shown and described the device as embodying a specific structure, I desire that it be understood that such changes may be made in said structure, as do not depart from the spirit and scope of the invention as claimed.

Having thus described my invention, what I claim as new, and desire to secure by Letters Patent of the United States, is:

1. In combination with a vehicle including a front axle, wheels connected therewith, steering arms connected with the wheels and a rod connecting the arms, headlight supporting brackets pivotally supported upon the vehicle, laterally directed crank arms carried by the brackets, means loosely connecting the arms with the rod whereby the latter is permitted limited movement with relation to the arms, and spring means connecting the bracket arms with the steering arms to yieldably take up the relative movement between the arms.

2. In combination with a vehicle including an axle, wheels connected therewith, steering arms connected with the wheels and a rod connecting the arms, headlight brackets pivotally supported upon the vehicle, laterally directed crank arms connected with the brackets, brackets secured to the rod, swivelly mounted loops, depending from the rod carried brackets having horizontally elongated openings therein receiving the bracket arms and permitting limited movement of the latter with relation to the rod, and spring means connecting the bracket arms with the steering arms to yieldably take up the relative movement between the arms.

In testimony whereof, I affix my signature hereto.

ERNEST EGGIMANN.